(No Model.)
J. B. EMERY.
SOLE TRIMMING MACHINE.
No. 528,467. Patented Oct. 30, 1894.
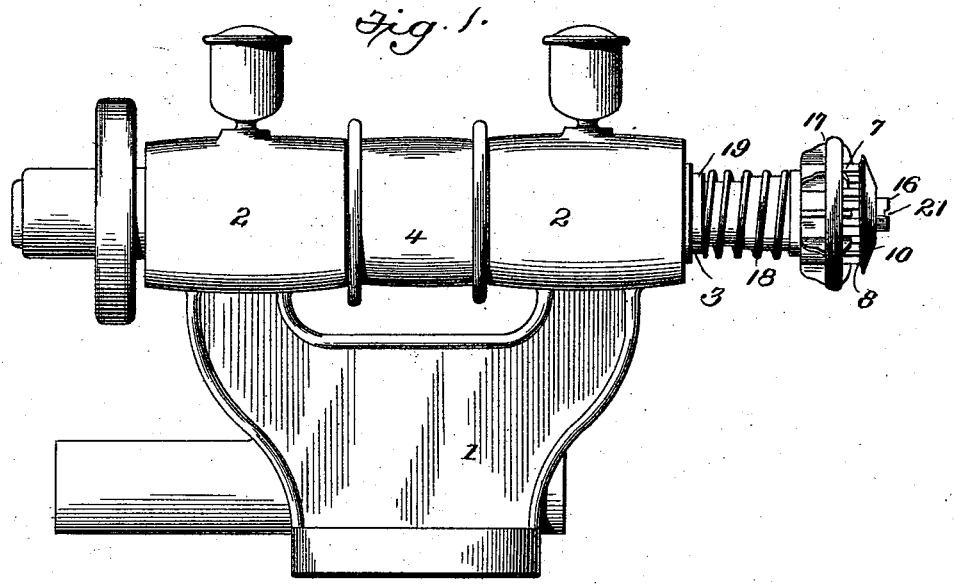
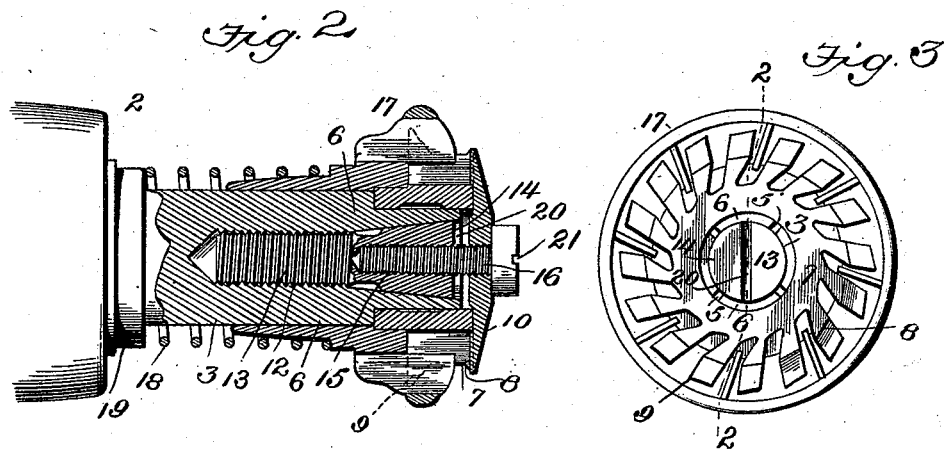
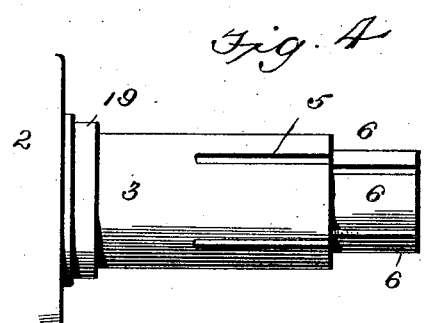
WITNESSES
INVENTOR
John B. Emery.
By James L. Norris
his Attorney

UNITED STATES PATENT OFFICE.

JOHN B. EMERY, OF LYNN, ASSIGNOR OF ONE-HALF TO THE BOSTON SHOE TOOL COMPANY, OF BOSTON, MASSACHUSETTS.

SOLE-TRIMMING MACHINE.

SPECIFICATION forming part of Letters Patent No. 528,467, dated October 30, 1894.

Application filed April 16, 1894. Serial No. 507,711. (No model.)

*To all whom it may concern:*

Be it known that I, JOHN B. EMERY, a citizen of the United States, residing at Lynn, in the county of Essex and State of Massachusetts, have invented new and useful Improvements in Sole-Trimming Machines, of which the following is a specification.

This invention relates to that type of machines for trimming the soles of boots and shoes, wherein a cutter having cutting blades is mounted on a rapidly rotating shaft, and operates in connection with an upper-guard and a yielding feather-edger or rest for trimming the edges of the soles.

In machines of the character alluded to it is important and essential for perfect work that the circular cutter be accurately centered on the shaft, in that if the points of the cutters are not all exactly the same distance from the axis of rotation of the shaft the cutter operates or cuts irregularly, or unevenly, or with jerks, which is very objectionable.

The accurate centering of circular sole-trimming cutters prior to my invention has been difficult to effect, owing to the lack of simplified means for accomplishing the purpose; and further the adjustments of the cutter on the shaft, and the interchanging of cutters slightly wear the shaft and cause the cutters to operate or cut irregularly or unevenly, and this is also a serious objection.

The objects of my invention are to avoid the defects mentioned, and to provide novel, simple, efficient, and economical means for accurately centering the cutters and compensating for any wear of the shaft, whereby sole-trimming machines of the type referred to are rendered better and more satisfactory, and efficient in use.

To accomplish these objects my invention consists essentially in the combination of a rotating shaft having at one extremity a slotted, radially expansible and contractible cylindrical bearing, a cutter having a bore adapted to receive said bearing, and means for expanding the slotted bearing to center the cutter and compensate for any wear of the bearing.

The invention also consists in the combination of a rotating-shaft having at one extremity a cylindrical bearing composed of radially expansible and contractible segmental sections, a screw engaged with the shaft and having a conical head for radially expanding the segmental sections and a central screw-threaded socket for receiving a clamping bolt, a cutter centered on the said bearing by the adjustment of the conically headed screw, a yielding feather-edger or rest, and a disk-guard interlocked with the cutter and held in position by the clamping-bolt.

The invention also consists in certain other features of construction and combination or arrangement of parts hereinafter described and claimed, reference being made to the accompanying drawings, in which—

Figure 1 is a side elevation of a sole-trimming machine provided with my invention; Fig. 2, a detail longitudinal sectional view of the front end portion of the shaft, the plane of section being on the line 2—2, Fig. 3. Fig. 3 is a front end elevation, omitting the upper-guard and its clamping-bolt; and Fig. 4 is a detail side elevation of the front end of the shaft, omitting the feather-edger, the cutter, and the upper-guard.

In order to enable those skilled in the art to make and use my invention, I will now describe the same in detail, referring to the drawings, wherein—

The numeral 1 indicates the supporting-frame of a sole-trimming machine having journal bearings 2 in which is horizontally arranged a cutter-carrying-shaft 3, adapted to be rapidly rotated through the medium of a belt-pulley 4, or otherwise. The front end portion of the shaft is hollow or tubular, and is formed with a cylindrical bearing having longitudinal slots 5 to form segmental sections 6 which are adapted to receive the cutter 7 and be radially expanded in the central orifice therein to truly center the cutter, so that all the cutting points of the blades or teeth lie exactly at the same distance from the axis of rotation of the shaft.

The cutter may be of any construction and configuration or shape suitable for trimming the edges of soles of boots and shoes, but preferably the cutter is the same, or substantially the same as disclosed in Letters Patent No.

452,540, issued May 19, 1891. In this type of cutter the cutting blades project in lines forming angles to the radii of the hub, and each blade has at one end an extended rand cutting edge 8, and at the opposite end an extension 9. The disk, shield, or upper-guard 10 is held at the outer side of the cutter and is formed on its inner surface with projections between which the rand cutting edges 8 lie, whereby the upper-guard and the cutter are interlocked or engaged one with the other.

The rotating-shaft 3 is provided in its forward portion with a central screw-threaded socket 12 to receive a screw 13 having a conical head 14 which lies between the segmental sections 6, in such manner that when the cutter is placed upon the segmental sections, and the screw 13 is tightened up, the conical head 14 operates to radially expand the sections 6, and thus accurately center the cutter, so that the cutting points of the blades or teeth all lie at exactly the same distance from the axis of rotation of the shaft.

The conical head 14 of the screw 13 is provided with a screw-threaded socket 15 to receive a screw-bolt 16, which passes through a central orifice in the upper-guard 10, for the purpose of clamping the latter in position and properly securing the cutter, so that it will not rotate on the cylindrical bearing formed by the segmental sections 6.

In machines of the character alluded to, the cutter bearing of the shaft is slightly worn when the cutter is removed and replaced, or when cutters are interchanged, but by my improved construction I am enabled to compensate for any wear of the cylindrical bearing, and at the same time accurately center the cutter on the shaft.

The cutter and upper-guard are designed to operate in connection with a yielding feather-edger 17 of any suitable construction. The feather-edger is in the form of a sleeve, and is acted upon by a spring 18 bearing at one end against the sleeve, and at the opposite end against an annular shoulder or collar 19 on the shaft. If the edges of the sole vary in thickness, the feather-edger accommodates itself thereto, and if the sole is very thin the feather-edger follows it up and in all instances finishes the margin of the trimmed edge of the sole. The feather-edger also constitutes in a measure a rest for the sole, and it is rotated by the rotation of the shaft.

The longitudinal slots in the front end portion of the shaft produce the segmental sections 6, and the latter are somewhat elastic, so that when the screw 13 is retracted or unscrewed the segmental sections will contract and render it easy to remove and replace the cutter.

The outer extremity of the conically headed screw 13 is preferably flattened, and to facilitate the adjustment of the screw through the medium of an ordinary screw-driver, I provide the conical head with a notch 20, and for the same purpose I provide the clamping-bolt with a notch 21.

By my invention I provide very simplified devices, by which an unskilled person can readily and very accurately center a cutter on the shaft, and the cutter is caused to operate or cut regularly and evenly.

Having thus described my invention, what I claim is—

1. The combination in a sole-trimming machine, of a rotating-shaft having at one extremity a slotted, radially expansible and contractible cylindrical bearing, a cutter having a bore adapted to receive said bearing, and means for expanding the slotted bearing to center the cutter and compensate for any wear of the bearing, substantially as described.

2. The combination in a sole-trimming machine, of a rotating-shaft having at one extremity a cylindrical bearing composed of radially expansible and contractible segmental sections, a screw engaged with the shaft and having a conical head for radially expanding the segmental sections and a central screw-threaded socket for receiving a clamping-bolt, a cutter centered on the said bearing by the adjustment of the conically headed screw, a yielding feather-edger or rest, and a disk-guard interlocked with the cutter and held by the clamping-bolt, substantially as described.

3. The combination in a sole-trimming machine, of a rotating-shaft having one end provided with a screw-threaded socket and a series of longitudinal slots to form a cutter-bearing composed of a series of radially expansible and contractible segmental sections, a screw engaged with said socket and having a conical head and a central screw-threaded socket, a cutter centered on the said cutter bearing, a guard at the end of the shaft, and a clamping-bolt passing through the guard into the screw-socket in the conically headed screw, substantially as described.

In testimony whereof I have hereunto set my hand and affixed my seal in presence of two subscribing witnesses.

J. B. EMERY. [L. S.]

Witnesses:
 ALBERT H. NORRIS,
 GEO. W. REA.